3,379,655
POLYMERISATION OF CYCLIC ACETALS
Herbert May, Langley, Oldbury, near Birmingham, Brian John Kendall-Smith, Northfield, Birmingham, and Susannah Burr, Welland, England, assignors to British Industrial Plastics Limited, London, England, a corporation of the United Kingdom
No Drawing. Filed Aug. 27, 1965, Ser. No. 484,163
Claims priority, application Great Britain, Sept. 1, 1964, 35,826/64
19 Claims. (Cl. 260—2)

ABSTRACT OF THE DISCLOSURE

The cyclic compounds trioxan, tetroxan, 1,3-dioxolan, 1,3,5-trioxepan and 1,3-dioxepan are polymerised under substantially anhydrous conditions in the presence, as catalysts, of antimony pentafluoride or a coordination complex thereof. The catalysts used herein have advantages over catalysts used hitherto, the polymerisation rate being much higher, and a lower catalyst concentration being used to obtain equivalent percentage yields of polymer.

This invention relates to polymers and is especially concerned with a process for the polymerisation of cyclic acetals, i.e. compounds having a ring system wherein there is contained at least one

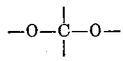

According to the present invention a process for polymerising a cyclic acetal comprises effecting the polymerisation in the presence of a catalytic amount of antimony pentafluoride or a complex thereof.

The term "polymerising" as used herein is intended to include homopolymerisation of the cyclic acetals, copolymerisation of the cyclic acetals with one or more other cyclic acetals, and copolymerisation of the cyclic acetals with one or more other copolymerisable compounds.

Typical cyclic acetals which may be polymerised according to the invention include trioxan, tetroxan, 1,3-dioxolan, 1,3,5-trioxepan and 1,3-dioxepan. They may be copolymerised with each other and with such other polymerisable compounds as styrene and styrene derivatives, aldehydes, allyl compounds, cyclic esters, unsaturated aliphatic hydrocarbons, vinyl ethers and esters, and N-vinyl and C-vinyl heterocyclic compounds. Suitable such copolymerisable compounds include styrene, a-methyl styrene, a-phenyl styrene, o-, m- and p-methyl styrenes, anethole, 1-vinyl naphthalene, 2-vinyl naphthalene, stilbene, indene, coumarone, acenaphthylene; chloral, benzaldehyde, anisaldehyde, cinnamaldehyde, piperonal, butyraldehyde; allyl acetate, allyl ethyl ether, allyl bromide, allyl methacrylate, allyl, Cellosolve, allyl cyanide, allyl benzene, allyl glycidyl ether, allyl alcohol, allyl beta-cyclohexyl propionate, allyl phenyl ether, diallyl phenyl phosphate; beta-propiolactone, delta-valerolactone, epsilon-caprolactone, trichlorethylidene lactate, methylene glycollate, lactide, ethylene oxalate, dioxanone; isobutene, butadiene, isoprene, pentadiene-1,3-cyclohexene, heptene-1, octene-1, cyclopentadiene, 4-vinyl cyclohexane, beta-pinene; methyl vinyl ether, ethyl vinyl ether, n-butyl vinyl ether, isobutyl vinyl ether, vinyl 2-ethyl hexyl ether, phenyl vinyl ether; vinyl acetate; N-vinyl carbazole, 2-vinyl pyridine and 2-vinyl-1,3-dioxan. Normally these other comonomers will make up between 0.01 and 50% of the units of the polymer, preferably between 0.1 and 20%.

Suitable catalysts for use in the process of this invention include antimony pentafluoride and its coordination and ionic complexes. Examples of suitable catalysts are those complexes with organic compounds in which the donor atom is oxygen or sulphur. Examples of these are the complexes with alcohols, phenols, acids, ethers, acid anhydrides, ketones, esters, aldehydes, dialkyl sulphides and mercaptans.

More specifically there may be mentioned the complexes of antimony pentafluoride with methanol, ethanol, propanol, butanol, triphenyl methyl alcohol, methyl acetate, butyl acetate, phenyl acetate, benzoic acid, acetic acid, acetic anhydride, acetone, methyl ethyl ketone, dimethyl ether, diethyl ether, methyl phenyl ether, phenol, acetaldehyde, dimethyl sulphide, diethyl sulphide and ethyl mercaptan. The complexes of antimony pentafluoride with alkyl cyanides, for example methyl and ethyl cyanides, are also suitable catalysts for use in the process of the invention, as are the ionic complexes of antimony pentafluoride with alkyl, aralkyl, aryl and acyl chlorides. For instance, we have found that when antimony pentafluoride is dissolved in certain halogenated solvents such as 1,1,2-trichloro-1,2,2-trifluoroethane, and allowed to stand, a solvated complex is formed which may be used as a polymerisation catalyst.

The process is preferably carried out with the minimum of moisture and suitably under anhydrous conditions. It may be conducted under bulk conditions or it may be of advantage to conduct the polymerisation in an inert liquid medium which may be a solvent or non-solvent for the monomers under the polymerisation conditions. Suitable solvents include saturated aliphatic and cycloaliphatic hydrocarbons. Cyclohexane is particularly suitable. It is often desirable to mix the monomer, or in the case of copolymerisation the comonomers, with an inert liquid medium and then to add the catalyst in solution in the same or a different medium. For instance, antimony pentafluoride is soluble in the fluorinated hydrocarbons "Arcton" and the "Freons" and a typical way of carrying out the process of the invention is to add a solution of antimony pentafluoride in one or other of these solvents to the monomer or monomers in admixture with, or in solution in, cyclohexane. Many of the antimony pentafluoride complexes are soluble in nitroparaffins, and thus addition of a solution of the complex in, say, nitroethane or nitropropane to a solution or suspension of the monomer(s) in cyclohexane represents another simple way of carrying out the process of the invention.

Some of the complexes of antimony pentafluoride, e.g. the diethyl etherate, may not be soluble in the inert liquid medium used for the polymerisation, and may form droplets therein. It is found that the polymer forms on the outside of these droplets so that the outsides only of the droplets are effective catalytically since a skin of polymer is formed. Consequently a larger proportion of such catalysts is required than is required when the catalyst being used is soluble in the inert liquid medium. Stirring is also very important when using these insoluble catalysts, as small droplets of catalyst are clearly more efficient than large droplets. The difficulties mentioned here are considerably reduced if the complex used is soluble in nitroethane or nitropropane and is added to the monomer—inert medium mixture in solution in nitroethane or nitropropane.

The temperature of the reaction is preferably between 0 and 100° C., depending on the reactants, solvents and so on, and the reaction may, if desired, be carried out under a dry inert atmosphere, such as nitrogen or carbon dioxide. In some cases, it is suitable to use a superatmospheric pressure.

The catalysts of the present invention can readily be removed from the formed polymer by suitable procedures, such as washing, milling or agitating the polymer with solvents or neutralising agents for the catalysts. It is particularly effective to remove the catalyst by treatment with a basic substance such as an amine or ammonia. The polymer is then thoroughly washed after such treatment to remove all residues and dried.

There may be incorporated into the polymers formed by the process of the present invention stabilisers, antioxidants, pigments, ultra-violet light absorbers and similar materials commonly used as additives to polymeric compositions. The polymers may also, if desired, be stabilised by treating them with compounds which react with any free end groups. For instance, they may be acetylated at the end-groups by reaction with acetic acid or acetic anhydride.

It is already known to polymerise trioxan, both with and without a copolymerisable monomer, and to polymerise certain other cyclic acetals in the presence of an electrophilic catalyst, such as boron trifluoride, certain of its complexes, stannic chloride, ferric chloride, certain other inorganic fluorides and oxonium salts. We have found that the catalysts of the present invention, when applied to the polymerisation of cyclic acetals, have certain advantages over the catalysts used hitherto; for example, in the polymerisation of trioxan, the polymerisation rate is much higher and a lower catalyst concentration may be used to obtain equivalent percentage yields of polymer. By means of the catalysts of the present invention we have been able to produce a trioxan homopolymer having a molecular weight more than twice that obtained using known catalysts.

The polymers produced in accordance with this invention are especially useful for compression, injection and extrusion mouldings.

The following examples are given for the purpose of illustrating the invention. In these examples the inherent viscosity has been determined at 60° C. on a 0.5% solution of the polymer in p-chlorophenol containing 2% a-pinene as stabiliser.

Example 1

28 gms. trioxan, freshly distilled from stearylamine and calcium hydride, and 56 gms. dry cyclohexane were stirred together in a flask fitted with a condenser and kept at 60° C. in a waterbath. 0.00336 gm. antimony pentafluoride was added as a 1% solution in 1,1,2-trichloro-1,2,2-trifluoroethane and polymer appeared after 10 seconds. After 1 hour the product was filtered off and washed with 200 mls. acetone and then with 200 mls. water. It was then heated to 85° C. in approximately 250 mls. 3% ammonia for 5 minutes and again filtered off. It was then thoroughly washed in water and acetone and dried in a vacuum oven. The yield was 10 gms. of white polymer of inherent viscosity 2.22.

Example 2

27 gms. trioxan, freshly distilled from stearylamine and calcium hydride, was stirred with 54 gms. dry cyclohexane and 0.81 gm. styrene in a flask fitted with a condenser and kept at 60° C. in a water bath. 0.5 gm. antimony pentafluoride-diethyl etherate was added and polymer appeared after 5 seconds. After one hour the product was filtered off and treated as described in Example 1. The yield was 19 gms. of white polymer of inherent viscosity 0.78.

Example 3

A reaction vessel was charged with 50 g. trioxan (freshly distilled over stearlyamine and calcium hydride) 100 g. cyclohexane and 1.5 g. dioxolan (distilled from calcium hydride). The mixture was maintained at 60° C. and stirred vigorously. 0.0075 g. antimony pentafluoride-diethyl etherate was injected into the mixture as a 25% solution in nitroethane, and polymerisation commenced rapidly. After 1½ hours the reaction was terminated by the addition of a small amount of acetone and the product was slurried and homogenised by high speed agitation with a larger amount of acetone and filtered. The filter cake was slurried and stirred with 1% aqueous ammonia at about 85° C. for ¼ hour, homogenised with water and acetone and dried in a vacuum at 50° C. The inherent viscosity of the product was 1.21. The thermal stability represented by the percentage weight loss $$\frac{222}{WX}$$

was measured by heating a thin film, compression moulded at the melting point, in air at 222° C. for X minutes. The thermal stability on heating the products for 10, 30 and 60 minutes respectively, was $$\frac{222}{W10} 2.1; \frac{222}{W30} 3.0; \frac{222}{W60} 3.8$$

Example 4

A reaction vessel was charged with 50 g. freshly distilled trioxan, 100 g. cyclohexane and 1.5 g. styrene. The mixture was maintained at 60° C. and stirred vigorously. 0.01 g. of the antimony pentafluoride - 1,1,2 - trichloro-1,2,2-trifluoroethane complex was injected into the mixture as a 25% solution in nitroethane and polymerisation commenced rapidly. After 2 hours the reaction was terminated and the product treated as in Example 3. The inherent viscosity of the product was 1.08.

Example 5

Example 4 was repeated using 1.5 g. beta propiolactone instead of styrene and antimony pentafluoride-ethyl sulphide complex as catalyst, reacting for 4 hours. The thermal stability, expressed as in Example 3, was $$\frac{222}{W10} 1.3: \frac{222}{W30} 4.0$$

Example 6

A reaction vessel was charged with 30 g. dioxolan (distilled from powdered calcium hydride) which was stirred rapidly. 0.0006 g. antimony pentafluoride, dissolved in 0.2 cc. 1,1,2-trichloro-1,2,2-trifluoroethane, was injected and contact with the atmosphere then excluded. Polymerisation commenced, shown by an increase in viscosity, and some polymer began to separate in about 1 hour. Reaction was continued for 16 hours. The polymer was then broken up and milled in acetone. The slurry so formed was filtered and the polymer homogenised with acetone, filtered off and dried under vacuum at room temperature. A yield of 75% of polymer, having a melting point of 60° C., was obtained.

Example 7

A reaction vessel was charged with 30 g. freshly distilled dioxolan and 0.9 g. indene, and the mixture was stirred rapidly at room temperature. 0.003 g. antimony pentafluoride-diethyl etherate, as a 25% solution in nitroethane, was injected and contact with the atmosphere then excluded. Polymerisation was allowed to continue for 2 hours and the polymer was recovered as in Example 6. The yield was 95% of a polymer melting at 57–58° C.

Example 8

Example 7 was repeated using 0.9 g. trioxan instead of indene and 0.15 g. of the antimony pentafluoride-diethyl sulphide complex (as a 25% solution in nitroethane) as the catalyst. Polymer crystallised slowly and the reaction was allowed to continue for 7 days before the polymer was recovered as above. The yield was 62% of a polymer melting at 54–55° C.

Example 9

A reaction vessel was charged with 115 g. trioxan (purified as in Example 3), 115 g. cyclohexane and 3.45 g. chloral, and the mixture was stirred vigorously whilst being maintained at 60° C. 0.2 g. of a 1.87% solution of antimony pentafluoride-methyl cyanide complex in nitropropane (0.00325% of the complex w./w. on trioxan)

was injected and very rapid precipitation of polymer occurred. After about 1 minute the reaction was stopped by the addition of about 200 cc. acetone and 5 cc. triethylamine. The polymer was filtered off, washed with acetone and then washed with water. It was then heated with about 1% ammonia solution for 10 minutes at about 85° C., filtered off, slurried with water and then acetone and dried in a vacuum oven at 60°. The yield was about 60% of a polymer having an inherent viscosity of 1.58.

Example 10

A reaction vessel was charged with 220 g. trioxan, 220 g. cyclohexane and 6.6 g. styrene, and the mixture was stirred vigorously whilst the temperature was maintained at 60° C. 10 cc. of a 0.25% solution of antimony pentafluoride - acetic acid complex in nitropropane (0.0114% of catalyst on trioxan) was injected. Polymerisation began rapidly and was continued for 2¼ hours. The polymer was recovered as described in Example 9.

Example 11

A reaction vessel was charged with 120 g. trioxan, 120 g. cyclohexane and 3.6 g. styrene, and the mixture was stirred vigorously as the temperature was brought to 60° C. A solution of 0.011 g. antimony pentafluoride-diethyl etherate in 2 ccs. nitropropane was injected and rapid reaction ensued, the whole mass becoming solid in about 1 minute. The polymer was recovered as in Example 9. The yield was 75 g., and the inherent viscosity of the polymer 1.44.

What is claimed is:

1. A process for polymerising a cyclic acetal selected from the group consisting of trioxan, tetroxan, 1,3-dioxolan, 1,3,5-trioxepan and 1,3-dioxepan which comprises effecting the polymerisation under substantially anhydrous conditions in the presence of a catalytic amount of antimony pentafluoride or a coordination complex thereof.

2. A process according to claim 1 wherein the polymerisation is effected in the presence of a catalytic amount of a complex of antimony pentafluoride with an organic compound whose donor atom is oxygen.

3. A process according to claim 2 wherein the polymerisation is effected in the presence of a catalytic amount of a complex of antimony pentafluoride with an ether.

4. A process according to claim 1 wherein the polymerisation is effected in the presence of a catalytic amount of a complex of antimony pentafluoride with an organic compound whose donor atom is sulphur.

5. A process according to claim 4 wherein said organic compound is a dialkyl sulphide.

6. A process according to claim 1 wherein the polymerisation is effected in the presence of a catalytic amount of a complex of antimony pentafluoride with an alkyl cyanide.

7. A process for polymerising a cyclic acetal selected from the group consisting of trioxan, tetroxan, 1,3-dioxolan, 1,3,5-trioxepan and 1,3-dioxepan which comprises effecting the polymerisation in the presence of a catalytic amount of antimony pentafluoride or a coordination complex thereof, the polymerisation being carried out in the presence of an inert liquid medium.

8. A process according to claim 7 wherein the said inert liquid medium is an aliphatic or cycloaliphatic hydrocarbon.

9. A process for polymerising a cyclic acetal selected from the group consisting of trioxan, tetroxan, 1,3-dioxolan, 1,3,5-trioxepan and 1,3-dioxepan which comprises effecting the polymerisation in the presence of a catalytic amount of antimony pentafluoride or a coordination complex thereof, the polymerisation being effected at a temperature of 0-100° C.

10. A process for polymerising a cyclic acetal selected from the group consisting of trioxan, tetroxan, 1,3-dioxolan, 1,3,5-trioxepan and 1,3-dioxepan which comprises effecting the polymerisation in the presence of a catalytic amount of antimony pentafluoride or a coordination complex thereof, the polymerisation being carried out under a dry inert atmosphere.

11. A process for preparing a homo-polymer of trioxan which consists essentially in stirring together trioxan and cyclohexane at about 60° C., adding to the mixture a catalytic amount of antimony pentafluoride and recovering the resulting polymer.

12. A process for preparing a trioxan-dioxolan copolymer which consists essentially in stirring together at about 60° C. a mixture of trioxan, dioxolan and cyclohexane, adding thereto a catalytic amount of antimony pentafluoride-diethyl etherate in nitroethane, terminating the polymerisation and recovering the resulting polymer.

13. A process for preparing a trioxan-styrene copolymer which consists essentially in stirring together at about 60° C. a mixture of trioxan, styrene and cyclohexane, adding thereto a catalytic amount of antimony pentafluoride - 1,1,2 - trichloro-1,2,2-trifluoroethane in nitroethane, terminating the polymerisation, and recovering the resulting polymer.

14. A process for preparing a trioxan-B-propiolactone copolymer which consists essentially in stirring together at about 60° C. a mixture of trioxan, B-propiolactone and cyclohexane, adding thereto a catalytic amount of antimony pentafluoride-ethyl sulphide in nitroethane, terminating the polymerisation, and recovering the resulting polymer.

15. A process for preparing dioxolan homopolymer which consists essentially in rapidly stirring dioxolan, adding thereto a catalytic amount of antimony pentafluoride in 1,1,2-trichloro-1,2,2-trifluoroethane, excluding air from the reaction mixture and allowing the polymerisation to proceed, terminating the polymerisation, and recovering the resulting polymer.

16. A process for preparing a copolymer which consists essentially in stirring rapidly at room temperature dioxolan and indene, adding thereto a catalytic amount of antimony pentafluoride-diethyl etherate in nitroethane, excluding air from the reaction mixture, allowing polymerisation to proceed, terminating the polymerisation, and recovering the resulting polymer.

17. A process for preparing a copolymer which consists essentially in stirring rapidly at room temperature a mixture of dioxolan and trioxan, adding thereto a catalytic amount of antimony pentafluoride-diethyl sulphide in nitroethane, excluding air from the reaction, allowing the polymerisation to proceed, terminating the polymerisation, and recovering the resulting polymer.

18. A process for preparing a copolymer which consists essentially in stirring together at about 60° C. a mixture of trioxan, chloral and cyclohexane, adding thereto a catalytic amount of antimony pentafluoride-diethyl sulphide in nitroethane, allowing the polymerisation to proceed, terminating the polymerisation, and recovering the formed polymer.

19. A process for preparing a copolymer which consists essentially in stirring rapidly at about 60° C. a mixture of trioxan, styrene and cyclohexane, adding thereto a catalytic amount of antimony pentafluoride-acetic acid in nitroethane, allowing polymerisation to proceed, terminating the polymerisation, and recovering the formed polymer.

References Cited

UNITED STATES PATENTS 2,795,571  6/1957  Schneider.
3,316,217  4/1967  Weissermel et al.

WILLIAM H. SHORT, *Primary Examiner.*

L. M. PHYNES, *Assistant Examiner.*